July 10, 1962 F. K. KUGEL ET AL 3,043,162
GAS TURBINE DRIVE
Filed Sept. 25, 1957 3 Sheets-Sheet 1

INVENTORS
Fritz W. Kugel
Walter Hans Schweizer
BY
Patent Agent

July 10, 1962 F. K. KUGEL ET AL 3,043,162
GAS TURBINE DRIVE
Filed Sept. 25, 1957 3 Sheets-Sheet 2

INVENTORS
Fritz M. Kugel
Walter Hans Schweizer
BY
Patent Agent

July 10, 1962     F. K. KUGEL ET AL     3,043,162
GAS TURBINE DRIVE

Filed Sept. 25, 1957     3 Sheets-Sheet 3

INVENTORS
Fritz K. Kugel
Walter Hans Schweizer
BY
Patent Agent

United States Patent Office
3,043,162
Patented July 10, 1962

3,043,162
GAS TURBINE DRIVE
Fritz K. Kugel, and Walter Hans Schweizer, Heidenheim, Germany, assignors to J. M. Voith G.m.b.H. Maschinenfabrik, Heidenheim, Germany
Filed Sept. 25, 1957, Ser. No. 686,259
Claims priority, application Germany Sept. 27, 1956
10 Claims. (Cl. 74—732)

The present invention relates to gas turbine drives and, more specifically, concerns an installation with a gas turbine followed by a hydrodynamic transmission for vehicles as well as for stationary installations.

The importance of gas turbines for the drive of vehicles and especially of rail vehicles has considerably increased in recent times. One of the great advantages of a gas turbine consists in that in addition to requiring relatively small space and being of relatively low weight, it has a torque-speed characteristic which is highly favorable for vehicles namely that at low turbine speed and therefore at low driving speed high torques are developed and vice versa. This favorable condition of the gas turbine during its operation is, however, in most instances not quite sufficient in order fully to meet the increasing requirements of modern driving operations with regard to traction forces, magnitude of the speed range, fuel consumption etc.

Furthermore, gas turbines have the drawback that their torque-speed field cannot be exploited within the entire working range. Above all, within the range of high torques and low speeds over a longer time of operation, a thermal overload of the blading may occur. Furthermore, in view of the high speeds and inertia forces, it is not possible to operate a gas turbine up to its otherwise possible highest speed.

It is, therefore, an object of the present invention to provide a gas turbine drive which will overcome the above mentioned drawbacks.

It is another object of this invention to provide a driving system employing a gas turbine, which even at high torques and low speeds over a longer period of operation will avoid thermal overloads of the blades and will be efficient within its entire possible working range.

These and other objects and advantages of the invention will appear more clearly from the following specification in connection with the accompanying drawings, in which:

FIG. 1 represents a diagrammatic illustration of a gas turbine locomotive equipped in conformity with the present invention with a fluid transmission comprising a torque converter and two coupling ranges.

FIG. 1a diagrammatically illustrates the hydraulic circuits of the transmission of the locomotive of FIG. 1 as well as the filling and discharging means for said circuits.

*General Arrangement*

The drawbacks outlined above of heretofore known gas turbine drives have been overcome according to the present invention by having the gas turbine followed by a specially designed hydrodynamic transmission. In conformity with the present invention, this hydrodynamic transmission comprises a lower velocity range with a torque converter and one or a plurality of higher velocity ranges with couplings while in addition thereto the torque converter is so designed that within the velocity range working with the torque converter, the hydrodynamic transmission will receive only such torques of the gas turbine which are less than the torques furnished by the gas turbine in its working range with thermal overload.

The torque converter according to the present invention is thus so designed that in conformity with its characteristic graph for its primary torque beginning at zero and following a parabola-like line (see line 32 of FIG. 2), the fluid transmission will take up or receive only such torques of the gas turbine which are always less than those occurring when the turbine works with thermal overload (see the shaded area 31). Such overload of the turbine blades is therefore automatically excluded at full as well as partial load of the turbine. Only after the turbine has passed through the endangered speed range of the turbine during its starting operation, will the torque converter or the fluid transmission take up or receive the full turbine torque (see operating point 33 of FIG. 2). On the other hand, due to its torque converting ability, the torque converter nevertheless furnishes high starting traction forces. Inasmuch as the torque converter exclusively within the lowermost velocity range of the hydrodynamic transmission, i.e. over a limited period of time only, is made effective, its restricted degree of efficiency has a small influence only upon the overall economic efficiency. During the major period of operation, the drive works with the coupling velocity range or velocity ranges in the upper driving range which coupling ranges yield a high degree of efficiency and due to the appropriately selected mechanical transmission yield favorable speed conditions.

Figure 2:
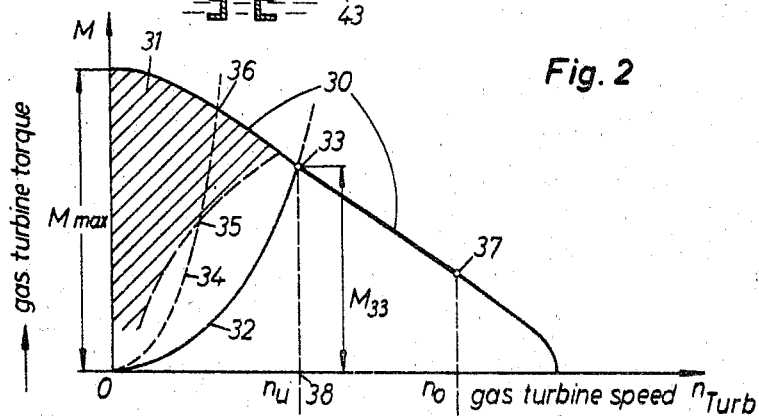
FIG. 2 is a graph illustrating the torques of the gas turbine of the locomotive of FIG. 1 in conformity with the speed of the gas turbine.

It is generally known how to design such hydraulic converter, in particular its diameter and the shape of the converter blades, in order to ensure that the converter absorbs the full gas turbine torque at the operating point 33 (gas turbine torque $M_{33}$ at gas turbine speed $n_u$ according to FIG. 2), which point is outside the gas turbine operating range with thermal overload. In this respect we refer by way of example to Bulletin No. 135-D "Three-Stage Hydraulic Torque Converters" of the firm Twin Disc Clutch Company, Hydraulic Division, Rockford, Ill., dated December 1951. According to the diagrams FIGURES 16 and 25 of this bulletin, this firm regularly manufactures torque converters for all normal speeds, torques and outputs, so that, if the speed-torque graph of the gas turbine is known, a suitable converter can be selected for operating point 33 according to FIG. 2, and be used in conjunction with the drive according to the invention. Additionally it may be mentioned that, in order to obtain the converter characteristics 32, 33 (see FIG. 2), converters may be used that are of differing design and which, by way of example, may also have single- or two-stage turbine bladings or single- or multiple-stage reaction bladings.

It may be mentioned that heretofore gas turbine drives have been suggested which comprise a fluid transmission having one torque converter range only or one coupling range only. However, with such a transmission the high requirements of modern driving operations cannot be met with regard to high traction forces, wide driving speed range and a suitable degree of efficiency and fuel consumption.

According to another heretofore known gas turbine drive for vehicles, the gas turbine is followed by a torque converter which latter is followed by a change gear transmission. The lasting or overall degree of efficiency of such a transmission is, however, low because the torque converter has to remain in its effective position within the entire driving range. Furthermore, the said heretofore known arrangements lack the essential finding according to the present invention that the torque converter must be designed in a certain definite way with regard to the gas turbine working range with thermal overload.

Another heretofore known arrangement relates to an installation according to which through the intervention of a hydraulic transmission with a torque converter and a hydraulic coupling, an auxiliary flywheel mass is driven by an auxiliary prime mover provided in addition to a main prime mover and designed as exhaust steam turbine, exhaust gas turbine, compressed air turbine or hydraulic turbine. However, the auxiliary flywheel mass is subjected to fundamentally other operational conditions than the drives for which the invention is intended and suitable. Above all, it should be noted that with the said known flywheel mass drive as well as with another heretofore known driving arrangement for a gas turbine ship drive with a torque converter range and a coupling range there is disclosed nothing concerning the design of the torque converter nor for which velocity range the torque converter and the coupling are intended.

While it is necessary that the couplings employed in conformity with the present invention must be able to be made effective and ineffective during operation, they may otherwise be designed in any convenient manner for instance as mechanical shiftable clutches such as friction clutches and the like. More expediently, hydraulic couplings are employed. These couplings as well as the torque converter may for making the same effective or ineffective be designed so that they can be filled or emptied as it is well-known with fluid transmissions used in various fields. With such an arrangement, in spite of the high speeds, and even at high outputs, a proper and shock-free shifting from one speed range to another speed range will be obtained.

It is also advantageous to provide an automatic shifting from one velocity range to another velocity range (torque converter and coupling ranges) of the transmission. In this way it will be possible to avoid the deficiency of at random operation and to bring about the change from one velocity range to another velocity range at the proper points of operation.

Structural Arrangement

Figure 1:
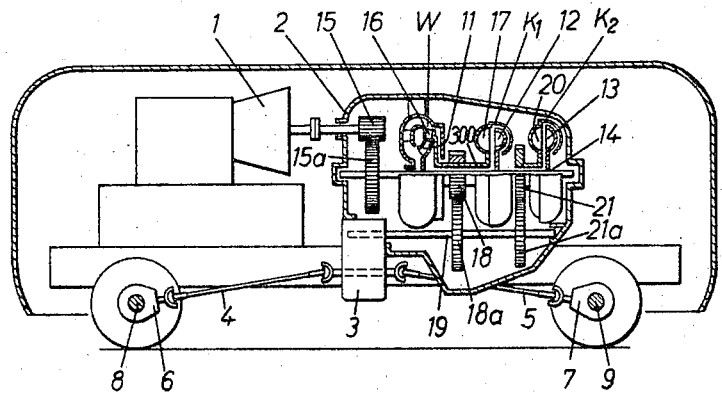

Referring now to the drawings in detail and FIG. 1 thereof in particular, the arrangement shown therein comprises a gas turbine locomotive in which the gas turbine 1 drives the driving axles 8 and 9 through the hydrodynamic transmission 2, the reversing transmission 3, the Cardan shafts 4, 5 and the axle transmissions 6, 7. The hydrodynamic transmission 2 comprises a torque converter W for the lower velocity range and two hydraulic couplings K1 and K2 for the intermediate velocity range and the high velocity range respectively. The pump wheels 11, 12 and 13 of these fluid circuits are keyed to a transmission shaft 14 common thereto and are continuously drivingly connected with the turbine through a pair of gears 15, 15a which reduce the high gas turbine speed to a proper value. The turbine wheel 16 of the torque converter and the turbine wheel 17 of the fluid coupling K1 drive the output shaft 19 through the intervention of a hollow shaft 300 and the stepdown gears 18, 18a. The turbine wheel 20 of the coupling K2 is drivingly connected with the output shaft 19 through the pair of gears 21, 21a which have a lower stepdown ratio than the gears 18, 18a. The output shaft 19 drives the reversing gear transmission 3 which may be of any standard construction and which is adapted to bring about a reversal in the direction of rotation and thereby a change from forward drive to rearward drive and vice versa.

By selectively filling and emptying the three fluid circuits W, K1 and K2 the first, the second or the third velocity range will be made effective. The shifting from one velocity range to another velocity range is according to the embodiment of FIG. 1 effected automatically in conformity with the driving speed. However, if desired this shifting may also be made dependent on additional factors of operation as for instance on the torque or the filling of the turbine.

Figure 1A:
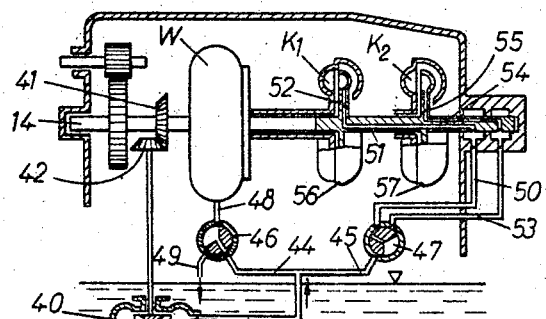

FIG. 1a diagrammatically illustrates the filling and emptying mechanism for the fluid circuits W, K1 and K2. In conformity with the arrangement shown in FIG. 1a, a filling pump 40 is continuously driven by the primary shaft 14 through the intervention of a bevel gear transmission 41, 42. The pump pressure conduits 43, 44, 45 communicate with the control valves 46 and 47. In the position shown in FIG. 1a of the control valve 46 which in this instance is designed as a three-way valve, the oil delivered by the pump 40 passes through the filling conduit 48 into the working chamber of the converter W thereby filling the same. When the valve 46 occupies a second position (not shown in the drawing), the conduit 48 communicates with the discharge conduit 49 while the pressure conduit 44 is closed off. This corresponds to the operative condition "emptying torque converter." The control valve 47 is adapted to be adjusted similarly by connecting the filling conduits 50, 51, 52 for the coupling K1 or the filling conduits 53, 54, 55 for the coupling K2 selectively with the pressure conduit 45 of the pump for selectively filling the coupling K1 or the coupling K2. At a third position of valve 47, all filling conduits 50–55 are closed off so that both fluid couplings K1 and K2 will be emptied. The emptying of the fluid couplings is effected by permanently opened discharge openings 56 and 57 which are arranged at the circumference of the coupling casings.

The operation of the locomotive drive will best be understood in connection with the graph of FIG. 2 in which line 30 represents the gas turbine torque possible at complete filling, said line 30 being plotted over the abscissa which has plotted thereon the gas turbine speeds $n_{Turb}$. When the turbine rotor is at a standstill ($n_{Turb}=0$), a maximum turbine torque $M_{Max}$ is obtainable. With increasing turbine speed, the turbine torque decreases gradually which characteristic is favorable for vehicle drives. The shaded area 31 of the torque speed field can, however, not be exploited or at best only for a very short time since otherwise the gas turbine blades would be damaged in view of too high thermal stresses.

FIG. 2 furthermore shows a line 32 for the torque required by the torque converter W from the gas turbine. This torque increases with increasing speed from zero along a parabola. As will be evident from FIG. 2, when driving within the torque converter speed range, the turbine is subjected to loads by such torques only which are less than the torque values within the working range with thermal overload. Only at the coniderable turbine speed $n_u$, at which such overload of the gas turbine will not occur any more, the torque converter receives the full gas turbine torque in conformity with the operational point 33. At this point, nevertheless due to the torque conversion brought about by the torque converter, a high traction force is available at the driving axles.

For purposes of comparison, reference may be had to the dash line 34 which represents the torque required from the turbine by a drive in which the torque converter is not designed in conformity with the present invention. As will be seen from the dash line, a thermal overload is possible within the speed range between the operational points 35 and 36.

If the maximum driving speed obtainable with the torque converter velocity range is not sufficient any longer, the shifting to the next higher velocity range (operational point 33) is automatically effected as mentioned above in conformity with the driving speed by emptying the torque converter W and by filling the fluid coupling K1. Within this coupling velocity range, the respective gas turbine torque while operating with maximum turbine filling i.e. a torque according to the line 33/37 is always received by the transmission to its full extent and is conveyed at a high degree of efficiency. Within this velocity range, the increase in speed is effected exclusively by varying the turbine speed from $n_u$ up to $n_o$.

In order to obtain a further increase in the driving speed, the fluid coupling K1 is emptied and the fluid coupling K2 is filled when the driving speed corresponding to the turbine speed $n_o$ is reached. Inasmuch as the output of the coupling K2 has a lower stepdown ratio, the driving speed obtainable thereby is higher than that of the previous coupling velocity range, i.e. the velocity range of the coupling K1.

Figure 3:
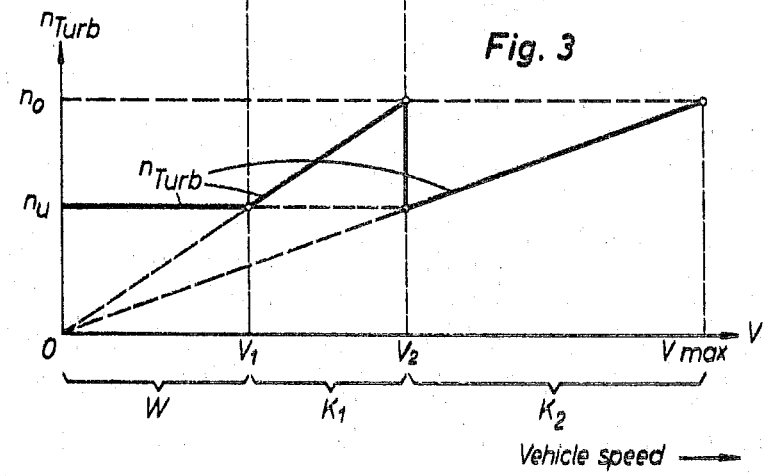
FIG. 3 is a graph related to that of FIG. 2 for the gas turbine speed in conformity with the vehicle speed.

The mutual relationship between the gas turbine speed $n_{Turb}$ and the vehicle speed V will be evident from the graph of FIG. 3, assuming that a permanent state of inertia prevails. Within the speed range from zero to $V_1$, the torque converter speed range is made effective, the turbine speed being approximately constant and having the value $n_u$ according to FIG. 2. Within this range, the torque converter due to the torque characteristic inherent thereto brings about the variation in the traction force and the speed. At the driving speed $V_1$ the transmission shifts automatically from the torque converter speed range to the speed range determined by the coupling K1. From this point on an increase in the turbine speed is required in conformity with the desired increase in the driving speed. When a driving speed of $V_2$ is obtained in correspondence with the turbine speed $n_o$, the shiftover from the speed range pertaining to the coupling K1 to the velocity range pertaining to the coupling K2 is effected. The course of the gas turbine speed according to FIG. 3 also applies to the speed of the transmission shaft 14 (primary shaft), the speed of shaft 14 being less merely in conformity with the stepdown transmission ratio of the gears 15, 15a.

As will be evident from FIG. 3, each velocity range of each coupling has associated therewith a turbine speed range from $n_u$ to $n_o$. The turbine speed $n_o$ is selected as high as is possible with regard to a tolerable fuel consumption and the highest permissible speed and inertia forces. The drive thus meets the further features of the invention according to which the stepdown ratio of each of the coupling velocity ranges pertaining to the couplings K1 and K2 respectively is to be dimensioned so and according to which the automatic shifting mechanism for such shifting points—in the present example for the shifting at the speeds $V_1$ and $V_2$—is so to be designed that each coupling velocity range corresponds to a speed range of the gas turbine which is located above the lowest gas turbine speed permissible with regard to the thermal overload and is located below the permissible maximum gas turbine speed. Under these conditions, in each coupling velocity range the most favorable portion of the turbine working range is employed which can be exploited without difficulties.

The required step-down ratio of each of the couplings K1 and K2 is obtained by a suitable selection of diameters and number of teeth of the toothed wheels 15, 15a, 18, 18a and 21, 21a. The automatic shifting mechanism may be designed similarly as shown in example according to FIG. 5, it may therefore have a measuring gear pump similar to pump 215, 216, a cylinder 226 and a piston 221 with compression spring. This compression spring is so dimensioned that at vehicle speed $V_1$ it is almost completely compressed by the measuring pump pressure and, at such time, brings about the change-over from the low speed range to the second speed range. Contrary to FIG. 5 a second similar cylinder with pressure piston, but with a stronger spring, may be provided. This spring, in this case, is compressed by the measuring gear pump pressure at a still higher vehicle speed $V_2$, so that change-over from the second speed range to the third is brought about.

Figure 4:
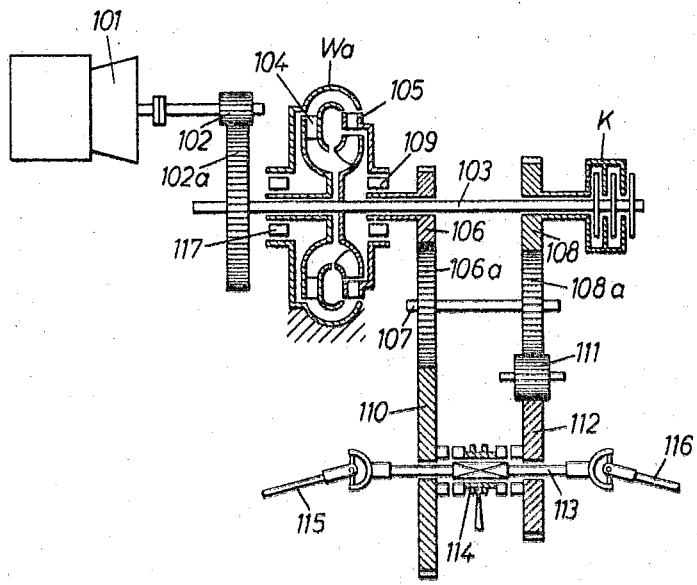
FIG. 4 is a modification of a drive for a rail vehicle with a converter range, a mechanical coupling range and a reversing gear transmission combined therewith.

FIG. 4 diagrammatically illustrates a modified drive according to the invention which is likewise intended for a rail vehicle. In this instance, a gas turbine 101 likewise drives the transmission shaft 103 of the hydrodynamic transmission through the intervention of stepdown gears 102, 102a. The hydrodynamic transmission comprises a permanently filled torque converter Wa for the lower velocity range and a disc friction clutch K for the higher velocity range. The turbine wheel 105 of the converter is drivingly connected with an intermediate transmission shaft 107 through the intervention of stepdown gears 106, 106a. Similarly, the driven member of the mechanical clutch K is drivingly connected with the shaft 107 through stepdown gears 108, 108a of a lower transmission ratio than that of the gears 106, 106a.

According to an expedient embodiment of the invention, the lowermost velocity range comprises in a manner known per se a free wheel drive 109 which according to the showing of FIG. 4 is arranged between the turbine wheel 105 and the pair of gears 106, 106a. The free wheel drive 109 interrupts the driving connection of the first velocity range ayways when the output speed of said first velocity range drops below that of the already and simultaneously thrown in next higher velocity range. The guide wheel or reaction member 104 of the torque converter will in this connection detach itself from the housing through the intervention of a second free wheel drive 117 and will likewise rotate freely so that the torque converter becomes ineffective. With drives having a plurality of coupling velocity ranges, also the lower coupling velocity ranges may have free wheel drives correspondingly associated therewith. Such an arrangement prevents not only a reduction in the traction force or interruption thereof during the shifting operation but also prevents a sudden relief of or dangerous drop in the load acting upon the turbine which would cause the turbine to race.

The hydrodynamic transmission according to FIG. 4 is furthermore directly combined with a reversing transmission which comprises a gear 110 for the forward drive and a reversing gear 111 as well as a gear 112 for the rearward drive. The gears 110 and 112 are freely rotatably mounted on the output shaft 13 and are adapted by means of the reversing shift sleeve 14 selectively to be coupled to shaft 113. The direct combination of the hydrodynamic transmission with the reversing transmission brings about a reduction in the required structural elements inasmuch as the gears on the counter shaft 107 serve a double purpose, and furthermore also reduce the overall dimensions so that a reduction in the space required is obtained. The reference numerals 115 and 116 respectively designate the cardan shafts leading to the driving axles not shown in FIG. 4.

Figure 5:
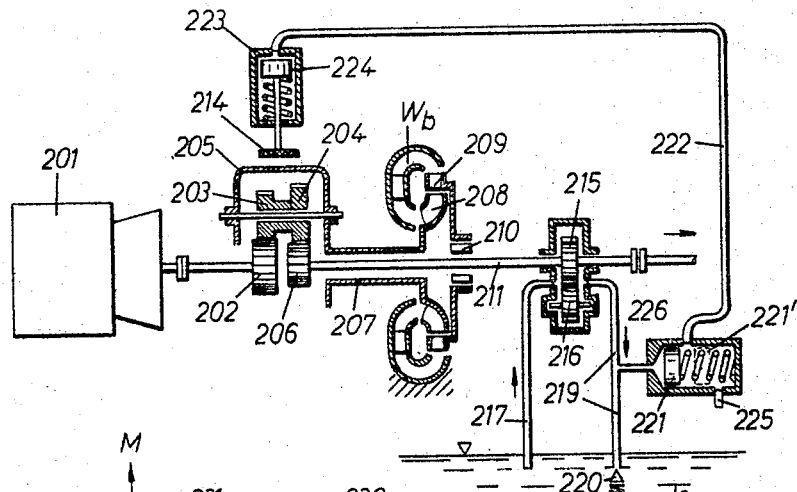
FIG. 5 represents a further embodiment of a gas turbine drive according to the invention which comprises a lower velocity range with a torque converter and an output divider-planetary gear transmission and a second purely mechanical velocity range.

Referring now to the embodiment of FIG. 5, the gas turbine 201 drives through a sun gear 202 the fixedly interconnected planetary gears 203 and 204, the planetary gear carrier 205 and a second sun gear 206. Furthermore, the planetary gear carrier 205 is through a hollow shaft 207 rigidly coupled to the pump wheel 208 of the permanently filled torque converter Wb. The turbine wheel 209 of the converter Wb is drivingly connected through free wheel drive 210 with the transmission output shaft 211 having keyed thereto the sun gear 206. The planetary gear carrier 205 is adapted to be braked by means of a band brake 214 so as to hold the planetary gear carrier 205 stationary.

When working in the lowermost velocity range, the band brake 214 is made ineffective. The planetary gear transmission then acts as a power dividing transmission inasmuch as one portion of the power conveyed thereto is hydraulically conveyed to the output shaft 211 through the planetary gear carrier 205, the hollow shaft 207, the pump wheel 208, the turbine wheel 209 and the free wheel drive 210, whereas the other portion of the power conveyed to the planetary gear transmission is conveyed purely mechanically to shaft 211 through the intervention of the sun gear 206. This arrangement brings about a considerable improvement of the overall degree of efficiency of the transmission inasmuch as only that portion of the power which is transmitted by the torque converter is subjected to the relatively low degree of efficiency of the torque converter. The remaining portion of the power, however, is mechanically transmitted at the good degree of efficiency obtainable with mechanical transmissions.

In spite of the power division, the advantages of the torque converter operation are substantially maintained since during the first short starting stage, the entire or almost the entire power is hydraulically transmitted whereby a high torque conversion and a soft power transmission is assured. With increasing driving speed, the mechanically transmitted power portion increases more and more automatically and in an infinitely variable manner whereby also the overall degree of efficiency of the transmission increases. The application of the power dividing principle which is known per se furthermore makes it possible to improve the degree of efficiency of the torque converter velocity range while maintaining the essential advantages of the hydraulic system. This is particularly important for gas turbine drives inasmuch as the gas turbines themselves have a relatively low degree of efficiency which fact has been one of the main reasons why heretofore gas turbines have been employed for the purpose involved to a rather limited extent only.

The operation with power division also bring about a forced speed reduction within the starting range, i.e. the driving engine is under such a high load that it is forced to run within a low speed range. This feature is desired with gas turbine drives inasmuch as a gas turbine due to its elastic behavior in operation (see torque characteristic) permits a considerable forced speed reduction and under such conditions furnishes increased driving torques. In contrast hereto, for instance with the far less elastic diesel engines, such forced speed reduction is in most instances not permissible. The design of the torque converter according to the present invention also assures that the forced speed reduction will be effected only to such an extent as this will be possible without thermal overload of the gas turbine.

The transmission according to FIG. 5 also furnishes a further velocity range inasmuch as by applying the band brake 214—which as to its effect corresponds to a mechanical shift clutch—brakes to a standstill the planetary gear carrier 205 and thereby the pump wheel 208 whereby the torque converter Wb becomes ineffective. The power transmission to the output shaft 211 is then effected purely mechanically through the planetary gear transmission 202–206 which now acts as mere transmission gear system. The free wheel drive 210 makes it possible that the turbine wheel 209 can now stop. All blades of the torque converter are then at a standstill so that no losses in energy will occur in the torque converter. If a still further velocity range should be desired, this can be obtained by having the shaft 211 followed by a customary change gear transmission.

Figure 6:
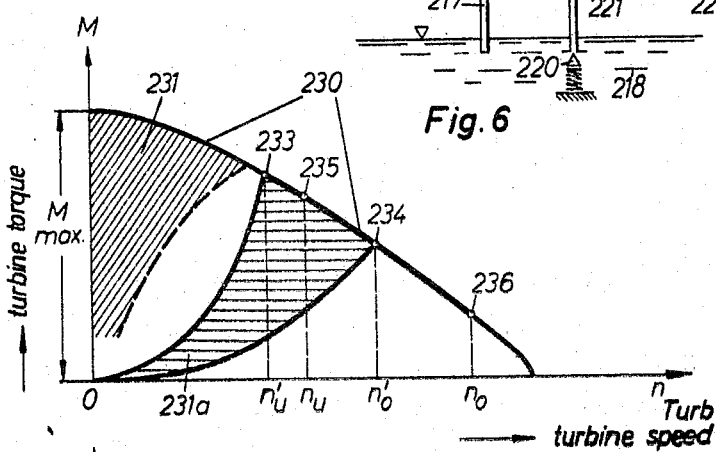
FIGS. 6 and 7 represent two graphs illustrating the course of the most important characteristics of the drive according to FIG. 5.
Figure 7:
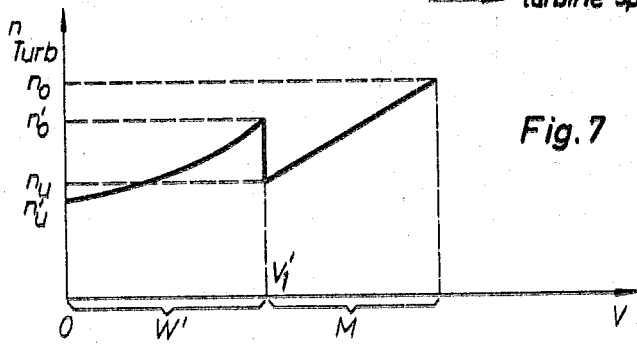

The graphs of FIGS. 6 and 7 show in a manner similar to that described in connection with FIGS. 2 and 3 the course of the most important characteristics or factors of the drive according to FIG. 5. More specifically, with reference to FIG. 6, the line 230 represents the gas turbine torque M in conformity with the gas turbine speed $n_{Turb}$ at complete filling, whereas the inclined shaded area 231 illustrates the non-permissible working range of the gas turbine, i.e. non-permissible in view of the thermal overload. The horizontally shaded working range area 231a between the operational points 0, 233 and 234 represents the lower velocity range with hydromechanical power transmission. The purely mechanical power transmission of the second velocity range is effected between the operational points 235 and 236 at the turbine speeds $n_u$ and $n_o$ respectively pertaining thereto.

FIG. 7 illustrates the course of the gas turbine speed $n_{Turb}$ in conformity with the output speed V. The speed range designated with the letter W' corresponds to the hydromechanical velocity range, whereas the range M corresponds to the purely mechanical second velocity range.

FIG. 5 also illustrates details of the automatically operating shifting mechanism, which comprises a measuring gear pump 215, 216 mounted on the output shaft 211 and withdrawing oil from the sump 218 through the suction conduit 217. The pressure conduit 219 has connected thereto a pressure relief valve 220 so that a return of the non-required pressure oil to the oil sump is possible and furthermore the respective oil pressure will represent a measure for the output speed. The pressure conduit 219 communicates with one end of the cylinder 226. As soon as the output speed V exceeds the value $V_1'$ (see FIG. 7), the correspondingly high oil pressure presses the spring loaded piston 221 toward the right into the position 221' indicated in dot-dash lines. As a result thereof, the pressure oil passes through conduit 222 into the braking cylinder 223 so that the braking piston 224 thereof is pressed downwardly. As a result thereof, the band brake 214 is applied which brings about a shifting from the lower hydromechanical velocity range to the purely mechanical second velocity range. The conduit 225 leading to the oil sump serves for venting the conduit 222 and the braking cylinder 223 when shifting back to the lower velocity range.

It is, of course to be understood that the present invention is, by no means, limited to the particular constructions shown in the drawings but also comprises any modifications within the scope of the appended claims. Thus, instead of hydraulic couplings or mechanical clutches, also for instance electromechanical or other couplings adapted to be shifted during operation may be provided. Furthermore, the torque converter may also be made ineffective by displacing a blade ring for instance the blade ring of the turbine wheel or by other means. It is also possible to equip the drive with three or more coupling velocity ranges. Furthermore, the invention may also be applied when the gas turbine cooperates with two parallelly arranged fluid transmissions and if for instance two parallelly arranged torque converters are provided for the first velocity range and two parallelly arranged couplings are provided for the second velocity range. For purposes of saving space, one coupling may be closely structurally combined with the torque converter. It may even be arranged in the hub or core chamber thereof. It is also possible to combine the torque converter and a fluid coupling to a single circuit which may selectively operate with stationary guide wheels or reaction members during torque converter operation or with freely rotating guide wheel or reaction member during operation with a coupling as has been described for instance in U.S. patent Serial No. 2,116,461.

As mentioned above, the invention is advantageously applicable not only for driving vehicles but also for stationary installations with similar conditions of operation as for instance deep drilling installations.

What we claim is:

1. A drive for vehicles and installations with similar conditions of operation, which comprises in combination: a gas turbine having an output shaft, a hydrodynamic transmission having an input shaft arranged for driving connection with the output shaft of said gas turbine, said hydrodynamic transmission comprising a torque converter effective during and determining a lower velocity range of said transmission, said transmission also comprising velocity range means by-passing said torque converter and adapted to be made effective to furnish at least one higher velocity range, and power conveying means interconnecting said input and output shafts, the diameter of said torque converter and said power conveying means being so dimensioned and the blading of said torque converter being so designed that in said lower velocity range determined by said torque converter said hydrodynamic transmission is adapted to receive such torques only of said gas turbine which at the respective gas turbine speed are less than the torques delivered at said respective speed by said gas turbine in its working range with thermal overload.

2. A drive for vehicles and installations with similar conditions of operation, which comprises in combination: a gas turbine having an output shaft, and a hydrodynamic transmission having an input shaft arranged for driving connection with the output shaft of said gas turbine, said hydrodynamic transmission comprising a torque converter effective during and determining a lower velocity range of said transmission, said transmission also comprising hydraulic coupling means adapted to be made effective to furnish at least one higher velocity range, and power conveying means interconnecting said input and output shafts, the diameter of said torque converter and said power conveying means being so dimensioned and the blading of said torque converter being so designed that in said lower velocity range determined by said torque converter said hydrodynamic transmission is adapted to receive such torques only of said gas turbine which at the respective gas turbine speed are less than the torques delivered at said respective speed by said gas turbine in its working range with thermal overload.

3. A drive for vehicles and installations with similar conditions of operation, which comprises in combination: a gas turbine having an output shaft, a hydrodynamic transmission having an input shaft arranged for driving connection with the output shaft of said gas turbine, said hydrodynamic transmission comprising a torque converter effective during and determining a lower velocity range of said transmission, said torque converter being provided with means for filling and emptying the same to thereby respectively make said torque converter effective and ineffective, said transmission also comprising velocity range means by-passing said torque converter and adapted to be made effective to furnish at least one higher velocity range, the diameter of said torque converter and said power conveying means being so dimensioned and the blading of said torque converter being so designed that in said lower velocity range determined by said torque converter said hydrodynamic transmission is adapted to receive such torques only of said gas turbine which at the respective gas turbine speed are less than the torques delivered at said respective speed by said gas turbine in its working range with thermal overload.

4. A drive for vehicles and installations with similar conditions of operation, which comprises in combination: a gas turbine having an output shaft, a hydrodynamic transmission having an input shaft arranged for driving connection with the output shaft of said gas turbine, said hydrodynamic transmission comprising a torque converter effective during and determining a lower velocity range of said transmission, said torque converter being provided with means for filling and emptying the same to thereby respectively make said torque converter effective and ineffective, said transmission also comprising fluid coupling means adapted to be made effective to furnish at least one higher velocity range, and power conveying means interconnecting said input and output shafts, said coupling means being provided with means for selectively filling or emptying the same to thereby make said coupling means effective or ineffective respectively, the diameter of said torque converter and said power conveying means being so dimensioned and the blading of said torque converter being so designed that in said lower velocity range determined by said torque converter said hydrodynamic transmission is adapted to receive such torques only of said gas turbine which at the respective gas turbine speed are less than the torques delivered at said respective speed by said gas turbine in its working range with thermal overload.

5. A drive for vehicles and installations with similar conditions of operation, which comprises in combination: a gas turbine having an output shaft, a hydrodynamic transmission having an input shaft arranged for driving connection with the output shaft of said gas turbine, said hydrodynamic transmission comprising a torque converter effective during and determining a lower velocity range of said transmission, said transmission also comprising velocity range means by-passing said torque converter and adapted to be made effective to furnish at least one higher velocity range, power conveying means interconnecting said input and output shafts, and automatic means for automatically shifting from one velocity range to another velocity range and vice versa, the diameter of said power conveying means being so dimensioned and the blading of said torque converter being so designed that in said lower velocity range determined by said torque converter said hydrodynamic transmission is adapted to receive such torques only of said gas turbine which at the respective gas turbine speed are less than the torques delivered at said respective speed by said gas turbine in its working range with thermal overload.

6. A drive for vehicles and installations with similar conditions of operation, which comprises in combination: a gas turbine having an output shaft, a hydrodynamic transmission having an input shaft arranged for driving connection with the output shaft of said gas turbine, said hydrodynamic transmission comprising a torque converter effective during and determining a lower velocity range of said transmission, said transmission also comprising coupling means adapted to be made effective to furnish at least one higher velocity range, power conveying means interconnecting said input and output shafts, said coupling means having associated therewith mechanical step down transmission means, and automatic means for automatically shifting from one velocity range to another velocity range, said mechanical transmission means being so designed and said automatic shifting means being designed for such shifting points that each velocity range pertaining to said coupling means is associated with a speed range of the gas turbine between the lowest permissible turbine speed with regard to the thermal overload and the highest still permissible turbine speed, the diameter of said power conveying means being so dimensioned and the blading of said torque converter being so designed that in said lower velocity range determined by said torque converter said hydrodynamic transmission is adapted to receive such torques only of said gas turbine which at the respective gas turbine speed are less than the torques delivered at said respective speed by said gas turbine in its working range with thermal overload.

7. A drive for vehicles and installations with similar conditions of operation, which comprises in combination: a gas turbine having an output shaft, a hydrodynamic transmission having an input shaft arranged for driving connection with said output shaft, said hydrodynamic transmission comprising a permanently filled torque converter determining the lowest velocity range of said transmission and having a turbine wheel keyed to said input shaft, said hydrodynamic transmission also comprising mechanical coupling means arranged for driving connection with said input shaft and determining at least one higher velocity range, power conveying means interconnecting said input and output shafts, and free wheel means operatively connected to said torque converter and adapted automatically to make the velocity range pertaining thereto ineffective when the speed of the latter is exceeded by the speed of the shifted-in next higher velocity range, the diameter of said torque converter and said power conveying means being so dimensioned and the blading of said torque converter being so designed that in said lower velocity range determined by said torque converter said hydrodynamic transmission is adapted to receive such torques only of said gas turbine which at the respective gas turbine speed are less than the torque delivered at said respective speed by said gas turbine in its working range with thermal overload.

8. In combination: a gas turbine, a hydrodynamic transmission having an input shaft for connection with said gas turbine and also having an output shaft, said hydrodynamic transmission including a torque converter determining the lowest velocity range of said hydrodynamic transmission, said hydrodynamic transmission also including coupling means adapted to be made effective to furnish at least one higher velocity range, power conveying means interconnecting said input and output shafts, and a power dividing planetary gear transmission operatively connected with said torque converter and said output shaft for conveying a portion of the output of said gas turbine through said torque converter to said output shaft and conveying another portion of the output of said gas turbine purely mechanically to said output shaft, the diameter of said torque converter and said power conveying means being so dimensioned and the blading of said torque converter being so designed that in said lower velocity range determined by said torque converter said hydrodynamic transmission is adapted to receive such torques only of said gas turbine which at the respective gas turbine speed are less than the torques delivered at said respective speed by said gas turbine in its working range with thermal overload.

9. A drive for vehicles and installations with similar conditions of operation, which comprises in combination: a gas turbine, a hydrodynamic transmission having an input shaft for driving connection with said gas turbine and also having an output shaft, said hydrodynamic transmission including a torque converter determining the lowest velocity range and coupling means adapted to be made effective to furnish at least one higher velocity range, power conveying means interconnecting said input and output shafts, a gear transmission connected to said output shaft, said coupling means having one element drivingly connected to said input shaft and having another element drivingly connected to said gear transmission, and gear means arranged for driving connection with said gear transmission and forming with the latter a reversing gear transmission for selectively driving said output shaft in one or the opposite direction, the diameter of said torque converter and said power conveying means being so dimensioned and the blading of said torque converter being so designed that in said lowest velocity range determined by said torque converter said hydrodynamic transmission is adapted to receive such torques only of said gas turbine which at the respective gas turbine speed are less than the torques delivered at said respective speed by said gas turbine in its working range with thermal overload.

10. In combination in a drive for vehicles and installations with similar conditions of operation: a gas turbine having an output shaft, a hydrodynamic transmission having an input shaft, a differential gear transmission having a first sun wheel keyed to said output shaft and having a second sun wheel keyed to said input shaft, said differential gear transmission also including a planetary gear carrier carrying two fixedly interconnected planetary gears meshing with said first and second sun gears respectively, a torque converter forming part of said hydrodynamic transmission and having a pump wheel connected to said planetary gear carrier and also having a turbine wheel, free wheel means interposed between said turbine wheel and said output shaft and adapted to effect or interrupt driving connection between said pump wheel and said output shaft depending on whether said turbine wheel is rotating at a higher or lower speed than said output shaft, operation of said torque converter determining a first velocity range of said hydrodynamic transmission, and brake means operable to hold said planetary gear carrier stationary thereby making said torque converter ineffective and establishing a second velocity range higher than said first velocity range, said torque converter and said differential gear transmission being so dimensioned and the blading of said torque converter being so designed that at said lower speed determined by said torque converter said hydrodynamic transmission is adapted to receive such torques only of said gas turbine which at the respective gas turbine speed are less than the torques delivered at said respective speed by said gas turbine in its working range with thermal overload.

References Cited in the file of this patent
UNITED STATES PATENTS

| | | |
|---|---|---|
| 2,301,294 | Kuhns et al. | Nov. 10, 1942 |
| 2,535,904 | Davis | Dec. 26, 1950 |
| 2,769,303 | Lucia | Nov. 6, 1956 |
| 2,799,179 | Kelbel et al. | July 16, 1957 |